US00RE35211E

United States Patent [19]

Harrison

[11] E Patent Number: Re. 35,211

[45] Reissued Date of Patent: Apr. 16, 1996

[54] ADHESIVES FOR LAMINATING THERMAL PRINT ELEMENTS

[75] Inventor: Daniel J. Harrison, Pittsford, N.Y.

[73] Assignee: Eastman Kodak Company, Rochester, N.Y.

[21] Appl. No.: 241,114

[22] Filed: May 10, 1994

Related U.S. Patent Documents

Reissue of:

[64] Patent No.: 4,713,365
Issued: Dec. 15, 1987
Appl. No.: 947,053
Filed: Dec. 29, 1986

[51] Int. Cl.[6] ..... B41M 5/035; B41M 5/38

[52] U.S. Cl. ..... 503/227; 428/195; 428/343; 428/349; 428/354; 428/355; 428/412; 428/480; 428/913; 428/914

[58] Field of Search ..... 8/471; 428/195, 428/480, 913, 914, 343, 349, 354, 355, 412; 503/227; 430/945

[56] References Cited

U.S. PATENT DOCUMENTS 4,541,830 9/1985 Hotta et al. ..... 428/914

FOREIGN PATENT DOCUMENTS 0178332 4/1986 European Pat. Off. ..... 503/227

*Primary Examiner*—B. Hamilton Hess
*Attorney, Agent, or Firm*—Harold E. Cole

[57] ABSTRACT

A thermal print element comprising a support having thereon a layer containing a thermally-transferred dye image, the element having at least one layer of adhesive thereon comprising a linear, random coplyester of one or more aromatic dibasic acids and one or more aliphatic diols, modified with up to 30 mole % of one or more aliphatic dibasic acids. The copolyester has a melt viscosity of between about 1,000 and about 20,000 poise at 150° C. The adhesive is used to laminate a cover sheet to one or both surfaces of the thermal print element.

17 Claims, No Drawings

ADHESIVES FOR LAMINATING THERMAL PRINT ELEMENTS

Matter enclosed in heavy brackets [ ] appears in the original patent but forms no part of this reissue specification; matter printed in italics indicates the additions made by reissue.

*This application is a reissue application for U.S. Pat. No. 4,713,365 issued on Dec. 15, 1987, based on U.S. Ser. No. 06/947,053, filed Dec. 29, 1986.*

This invention relates to the use of certain adhesives to laminate cover sheets to thermal print elements for protective and security purposes.

In recent years, thermal transfer systems have been developed to obtain prints from pictures which have been generated electronically from a color video camera. According to one way of obtaining such prints, and electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271 by Brownstein entitled "Apparatus and Method for Controlling A Thermal Printer Apparatus," issued Nov. 4, 1986, the disclosure of which is hereby incorporated by reference.

The use of the above process to produce indentification (ID) cards is described in copending application Ser. No. 947,052, of Sethi et al., filed of even date herewith, entitled "High–Security Identification Card Obtained By Thermal Dye Transfer". It would be desirable to provide protection and additional tamper-proofing of such ID cards.

Heat-lamination of a cover sheet of polymeric film, such as polycarbonate or a polyester such as poly(ethyleneterephthalate), over the entire surface and extended sides of an ID card is an excellent way to increase protection from surface abrasion and to minimize tampering. Attempts to remove the cover sheet ideally should result in its destruction to prevent alteration and reuse.

It would be desirable to provide an adhesive, meltable at a controlled temperature, that adheres rapidly, firmly and uniformly, to the ID card receiver layer surface, card support stock, and a protective cover sheet. It would also be desirable to provide an adhesive that would not adversely affect dye-stability nor alter definition of the thermal dye-transfer image or any auxiliary information on the card.

These and other objects are achieven in accordance with this invention which comprises a thermal print element comprising a support having thereon a layer containing a thermally-transferred dye image, the element having at least one layer of adhesive thereon comprising a linear, random copolyester of one or more aromatic dibasic acids and one or more aliphatic diols, modified with up to 30 mole % of one or more aliphatic dibasic acids, the copolyester having a melt viscosity of between about 1,000 and about 20,000 poise at 150° C.

In a preferred embodiment of the invention, the aromatic dibasic acid is terephthalic acid, isophthalic acid, dipicolinic acid or 2,2-bis(p-carboxyphenyl)propane. In another preferred embodiment, the aliphatic diol is ethyleneglycol, diethyleneglycol, triethyleneglycol, 1,4-butanediol, 1,2-propanediol, 1,3-propanediol, 1,6 -hexanediol, cyclohexanedimethanol, or 1,4-cyclohexanediol. In yet another preferred embodiment, the aliphatic dibasic acid is sebacic acid, glutaric acid, adipic acid, azelaic acid, or 1,4-cyclohexanedicarboxylic acid.

The adhesive layer may be solvent-coated to the cover sheet or may be thermally-applied as a self-supporting layer to either or both sides of the thermal print element or the cover sheet. Any thickness of adhesive may be used provided it provides a secure bond to the cover sheet. In general, good results hav been obtained using the thickness of from about 5 to about 100 μm.

The layer containing the dye image employed in the invention may comprise, for example, a polycarbonate, a polyurethane, a polyester, polyvinyl chloride, poly(styrene-co-acrylonitrile), poly(caprolactone) or mixtures thereof. The dye image-receiving layer may be present in any amount which is effective for the intended purpose. In general, good results have been obtained at a concentration of from about 1 to about 5 $g/m^2$.

In a preferred embodiment, a polycarbonate layer containing the dye image is used which has a number average molecular weight of at least about 25,000. The term "polycarbonate" as used herein means a polyester of carbonic acid and glycol or a divalent phenol. Examples of such glycols or divalent phenols are p-xylene glycol, 2,2-bis(4-oxyphenyl-)propane, bis(4-oxyphenyl)methane, 1,1-bis(4-oxyphenyl)ethane, 1,1-bis-oxyphenyl)butane, 1,1-bis(oxyphenyl)cyclohexane, 2,2-bis(oxyphenyl)butane, etc.

In an especially preferred embodiment of the invention, the above-described polycarbonate is a bisphenol A polycarbonate. In another preferred embodiment of the invention, the bisphenol A polycarbonate comprises recurring units having the formula:

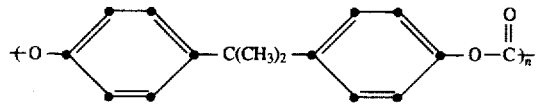

wherein n is from about 100 to about 500.

Examples of such polycarbonates include: General Electric Lexan® Polycarbonate Resin #ML–4735 (Number average molecular weight app. 36,000), and Bayer AG, Makrolon #5705® (Number average molecular weight app. 58,000).

The polycarbonate employed in the layer containing the dye image may be present in any amount which is effective for the intended purpose. In general, good results have been obtained at a total concentration of from about 1 to about 5 $g/m^2$.

As noted above, the adhesives of the invention are used to laminate a cover sheet to one or both surfaces of the thermal print element. There can be used as the cover sheet, for example, various polymeric materials such as poly(ethylene terephthalate), polycarbonate, polystyrene, polyethylene, cellulose acetate, poly(vinyl alcohol-co-acetal), etc.

Specific copolyesters useful in the invention include the following materials:

Compound (1): a random copolyester formed from 1,4-butanediol; 1,6-hexanediol; and terephthalic acid (mole ratio of diols: 80% $C_6$, 20% $C_4$)

Compound (2): a random copolyester formed from 1,4-butanediol; 1,6-hexanediol; terephthalic acid; and isophthalic acid (mole ratio of diols: 65% $C_6$, 35% $C_4$; mole ratio of acids: 90% terephthalic, 10% isophthalic)

Compound (3): a random copolyester formed from diethyleneglycol; 1,4-butanediol; terephthalic acid; and glutaric acid (mole ratio of diols: 55% $C_4$, 45% gylcol; mole ratio of acids: 70% terephthalic, 30% glutaric)

Compound (4): a blend of a random copolyester formed from (3) and a random copolyester formed from cyclohexanedimethanol; ethyleneglycol; and terephthalic acid (mole ratio of diols: 69% $C_2$, 31% cyclohexanedimethanol)

Compound (5): a random copolyester formed from 1,4-butanediol; 1,6-hexanediol; terephthalic acid; and isophthalic acid (mole ratio of diols: 80% $C_6$, 20% $C_4$; mole ratio of acids: 80% terephthalic, 20% isophthalic)

Compound (6): a random copolyester formed from 1,4-butanediol; sebacic acid; terephthalic acid; and isophthalic acid (mole ratio of acids: 15% sebacic, 35% terephthalic, 50% isophthalic) sold commercially as Bostik 7962 (Bostik Chemical Group, Emhart Corp.)

The support for the thermal print element of the invention may be a transparent film such as a poly(ether sulfone), a polyimide, a cellulose ester such as cellulose acetate, a poly(vinyl alcohol-co-acetal) or a poly(ethylene terephthalate). The support may also be reflective such as baryta-coated paper, white polyester (polyester with white pigment incorporated therein), an ivory paper, a condenser paper or a synthetic paper such as duPont Tyvek®. In a preferred embodiment, polyester with a white pigment incorporated therein is employed. It may be employed at any thickness desired, usually from about 50 μm to about 1000 μm.

A dye-donor element that is used with the thermal print element of the invention comprises a support having thereon a dye layer. Any dye can be used in such a layer provided it is transferable to the dye image-receiving layer of the dye-receiving element by the action of heat to provide the thermal print. Especially good results have been obtained with sublimable dyes. Examples of sublimable dyes include anthraquinone dyes, e.g., Sumikalon Violet RS® (product of Sumitomo Chemical Co., Ltd.) Dianix Fast Violet 3R-FS® (product of Mitsubishi Chemical Industries, Ltd.), and Kayalon Polyol Brilliant Blue N-BGM® and KST Black 146® (products of Nippon Kayaku Co., Ltd.); azo dyes such as Kayalon Polyol Brilliant Blue BM®, Kayalon Polyol Dark Blue 2BM®, and KST KR® (products of Nippon Kayaku Co., Ltd.), Sumickaron Diazo Black 5G® (product of Sumitomo Chemical Co., Ltd.), and Miktazol Black 5GH® (product of Mitsui Toatsu Chemicals, Inc.); direct dyes such as Direct Dark Green B® (product of Mitsubishi Chemical Industries, Ltd.) and Direct Brown M® and Direct Fast Black D® (products of Nippin Kayaku Co. Ltd.); acid dyes such as Kayanol Milling Cyanine 5R® (product of Nippon Kayaku Co. Ltd.); basic dyes such as Sumicacryl Blue 6G® (product of Sumitomo Chemical Co., Ltd.), and Aizen Malachite Green® (product of Hodogaya Chemical Co., Ltd.);

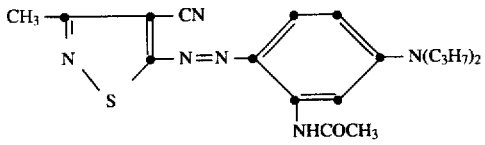

(magenta)

-continued

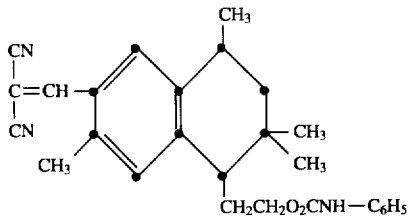

(yellow)

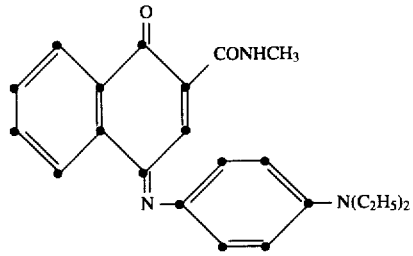

(cyan)

or any of the dyes disclosed in U.S. Pat. No. 4,541,830, the disclosure of which is hereby incorporated by reference. The above dyes may be employed singly or in combination to obtain a monochrome. The dyes may be used at a coverage of from about 0.05 to about 1 g/m$^2$ and are preferably hydrophobic.

The dye in the dye-donor element is dispersed in a polymeric binder such as a cellulose derivative, e.g., cellulose acetate hydrogen phthalate, cellulose acetate, cellulose acetate propionate, cellulose acetate butyrate, cellulose triacetate; a polycarbonate; poly(styrene-co-acrylonitrile), a poly(sulfone) or a poly(phenylene oxide). The binder may be used at a coverage of from about 0.1 to about 5 g/m$^2$.

The dye layer of the dye-donor element may be coated on the support or printed thereon by a printing technique such as a gravure process.

Any material can be used as the support for the dye-donor element provided it is dimensionally stable and can withstand the heat of the thermal printing heads. Such materials include polyesters such as poly(ethylene terephthalate); polyamides; polycarbonates; glassine paper; condenser paper; cellulose esters such as cellulose acetate; fluorine polymers such as polyvinylidene fluoride or poly(tetrafluoroethylene-co-hexafluoropropylene); polyethers such as polyoxymethylene; polyacetals; polyolefins such as polystyrene, polyethylene, polypropylene or methylpentane polymers; and polyimides such as polyimide-amides and polyether-imides. The support generally has a thickness of from about 2 to about 30 μm. It may also be coated with a subbing layer, if desired.

A dye-barrier layer comprising a hydrophilic polymer may also be employed in the dye-donor element between its support and the dye layer which provides improved dye transfer densities. Such dye-barrier layer materials include those described and claimed in application Ser. No. 813,294 entitled "Dye-barrier Layer for Dye-Donor Element Used in Thermal Dye Transfer" by Vanier et al, filed Dec. 24, 1985.

The reverse side of the dye-donor element may be coated with a slipping layer to prevent the printing head from sticking to the dye-donor element. Such a slipping layer would comprise a lubricating material such as a surface active agent, a liquid lubricant, a solid lubricant or mixtures thereof, with or without a polymeric binder. Preferred lubricating materials include oils or semi-crystalline organic solids that melt below 100° C. such as poly(vinyl sterate), beeswax, perfluorinated alkyl ester polyethers, poly(caprolactone), carbowax or poly(ethylkene glycols). Suitable polymeric binders for the slipping layer include poly(vinyl alcohol-co-butyral), poly(vinyl alcohol-co-acetal), poly(styrene), poly(-vinyl acetate), cellulose acetate butyrate, cellulose acetate or ethyl cellulose.

The amount of the lubricating material to be used in the slipping layer depends largely on the type of lubricating material, but is generally in the range of about 0.001 to about 2 g/m$^2$. If a polymeric binder is employed, the lubricating material is present in the range of 0.1 to 50 weight %, preferably 0.5 to 40, of the polymeric binder employed.

As noted above, dye-donor elements are used to form a dye transfer image in the thermal print. Such a process comprises imagewise-heating a dye-donor element and transferring a dye image to a dye-receiving element as described above to form the dye transfer image in a thermal print element.

The dye-donor element employed with the thermal print elements of the invention may be used in sheet form or in a continuous roll or ribbon. If a continuous roll or ribbon in employed, it may have only one dye thereon or may have alternating areas of different dyes such as cyan, magenta, yellow, black, etc., as disclosed in U.S. Pat. No. 4,541,830.

In a preferred embodiment of the invention, a dye-donor element is employed which comprises a poly(ethylene terephthalate) support coated with sequential repeating areas of cyan, magenta and yellow dye, and the above process steps are sequentially performed for each color to obtain a three-color dye transfer image. Of course, when the process is only performed for a single color, then a monochrome dye transfer image is obtained.

Thermal printing heads which can be used to transfer dye from the dye-donor elements employed in the invention are available commercially. There can be employed, for example, a Fujitsu Thermal Head (FTP-040 MCS001), a TDK Thermal Head F415 HH7-1089 or a Rohm Thermal Head KE 2008-F3.

The following examples are provided to illustrate the invention.

EXAMPLE 1

Adhesion Test

A three-sheet composite was prepared in the following manner. A 175 μm thick thermoformed sheet of General Electric Lexan 131 (a bisphenol A polycarbonate) was laminated to a 75 μm thick thermal formed or solvent cast sheet of the polyester adhesive as indicated in the Table by passage through a Laminex Co. PA-KIII-E laminating device at 150° C.

A second sheet of the same polycarbonate material was laminated to the adhesive side of the above composite by passage through the laminating device at 175° C. A siliconized paper tab was inserted on a portion of the composite for the second lamination. Both laminations were made with a paper carrier release liner to avoid fusing to the laminator.

The composite was allowed to stand at room temperature for a minimum of 14 hours before an adhesion measurement. A test of the adhesive bond of the polycarbonate to the polyester adhesive was then run using an Instron Universal Testing Machine Model TM-1122. A one-inch wide sample was cut from the composite and formed into a T-peel joint for testing at a peel rate of 5 inches/min. Measured peel forces above 1000 g/in are desirable. The results obtained are tabulated in the Table.

Viscosities of each invention and control polyester were evaluated by a standard melt-shear viscosity test at a shear rate of 1/sec at 150° C. The following results were obtained:

TABLE

| Adhesive | Viscosity (poise) | Adhesion (g/in) |
|---|---|---|
| Cmpd. 1 | 7,800 | 2500 |
| Cmpd. 2 | 7,500 | 1750 |
| Cmpd. 3 | 6,900 | 3500 |
| Cmpd. 4 | 10,500 | 5000 |
| Cmpd. 5 | 6,000 | 6000 |
| Cmpd. 6 | 4,000 | 5250 |
| Control 1 | 150000 | 100 |
| Control 2 | >>150000 | 17 |

Control 1: a random copolyester formed from cyclohexanedimethanol; ethyleneglycol; and terephthalic acid (mole ratio of diols: 69% $C_2$, 31% cyclohexanedimethanol)

Control 2: a random copolyester formed from cyclohexanedimethanol; terephthalic acid; and isophthalic acid (mole ratio of acids: 83% terephthalic, 17% isophthalic)

The above results indicate that the copolyesters of the invention have much superior adhesion than the comparison copolyesters.

EXAMPLE 2

Lamination of ID Card (A) A yellow dye-donor element was prepared by coating the following layers in the order recited on a 6 μm poly(ethylene terephthalate) support:

(1) Dye-barrier layer of gelatin nitrate (gelatin, cellulose nitrate and salicylic acid in approximately 20:5:2 weight ratio in a solvent of acetone, methanol and water) (0.17 g/m$^2$), (2) Dye layer containing the following yellow dye (0.39 g/m$^2$) in cellulose acetate (40% acetyl) (0.38 g/m$^2$) coated from a butanone, acetone and cyclohexanone (14:8:1) solvent mixture:

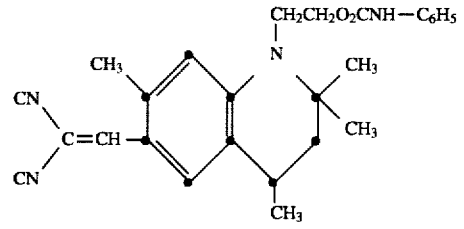

On the back side of the element, a slipping layer of poly(vinyl stearate) (0.3 g/m$^2$) in polyvinylbutyral (Butvar-76® Monsanto) (0.45 g/m$^2$) was coated from tetrahydrofuran solvent.

(B) A magenta dye-donor element was prepared similar to (A) except that the dye layer (2) comprised the following magenta dye (0.22 g/m$^2$) in cellulose acetate hydrogen phthalate (0.38 g/m$^2$) coated from a butanone, acetone and cyclohexanone (14:4:1) solvent mixture:

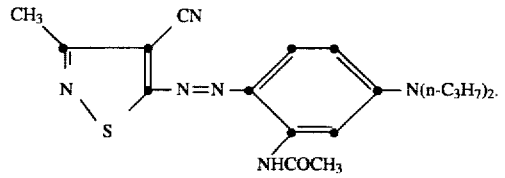

(C) A cyan dye-donor element was prepared similar to (A) except that the dye layer (2) comprised the following cyan dye (0.37 g/m$^2$) in cellulose acetate hydrogen phthalate (0.42 g/m$^2$) coated from a butanone, acetone and cyclohexanone (14:4:1) solvent mixture:

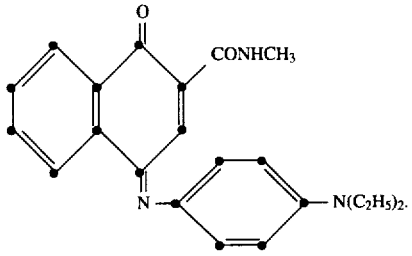

A dye-receiving element was prepared by coating a solution of Makrolon 5705® ( a bisphenol A polycarbonate resin from Bayer AG) from a methylene chloride and trichloroethylene solvent mixture at a coverage of 2.9 g/m$^2$ on top of an ICI Melinex® "White Polyester" reflective support:

The dye side of each dye-donor element strip 3 inches (75 mm) wide was placed in contact with the dye image-receiving layer side of the printed card stock. The assemblage was fastened in the jaws of a stepper motor driven pulling device. The assemblage was laid on top of a 0.55 (14 mm) diameter rubber roller and a Fujitsu Thermal Head (FTP-040MCS001) and was pressed with a spring at a force of 3.5 pounds (1.6 kg) against the dye-donor element side of the assemblage pushing it against the rubber roller.

The imaging electronics were activated causing the pulling device to draw the assemblage between the printing head and roller at 0.123 inches/sec (3.1 mm/sec). Coincidentally, the resistive elements in the thermal print head were heated at controlled times from 0 to 4.5 msec to generate a continuous tone personalized test image. The voltage supplied to the print head was approximately 19 v representing approximately 1.75 watts/dot. A multicolor ID card was thus obtained.

The above-obtained ID card was then laminated for protection in the following manner. Cover sheets of 175 μm thick polycarbonate were first laminated to a 75 μm thick thermal-formed or solvent-cast adhesive sheet, the laminated to the ID card described above. A second adhesive-laminated cover sheet was subsequently laminated to the back-side of the ID card. This provided protection for front and back sides of the printed card.

A forced peel of the double-laminated composite using the invention copolyester adhesives stripped the polycarbonate dye-receiver layer containing the thermally-transferred dye image off the white polyester support of the thermal print. This indicates that a "secure" lamination was obtained, i.e., one that could not be tampered with without detection.

However, peeling of the double-laminated composite using the control copolyester adhesives resulted merely in easy delamination at the adhesive layer-receiver layer interface of the adhesive layer-cover sheet interface. Because of this weak adhesion, durability and security of this composite was unsatisfactory.

Visual observation of image smear was also made on the laminated cards. None of the invention adhesive polymers produced any noticeable smear. In addition, none of the invention adhesive polymers had any adverse affect on dye-light stability.

The invention has been described in detail with particular reference to the preferred embodiments thereof, but it will be understood that variations and modifications can be effected within the spirit and scope of the invention.

What is claimed is:

1. A thermal print element comprising a support having thereon a layer containing a thermally-transferred dye image, said element having at least one layer of adhesive thereon comprising a linear, random copolyester of one or more aromatic dibasic acids and one or more aliphatic diols, modified with up to [30] *15* mole % of one or more aliphatic dibasic acids, said copolyester having a melt viscosity of between about 1,000 and about 20,000 poise at 150° C.

2. The element of claim 1, wherein sai aromatic dibasic acid is terephthalic acid, isophthalic acid, dipicolinic acid or 2,2-bis(p-carboxyphenyl)propane.

3. The element of claim 1 wherein said aliphatic diol is ethyleneglycol, diethyleneglycol, triethyleneglycol, 1,4-butanediol, 1,2-propanediol, 1,3-propanediol, 1,6-hexanediol, cyclohexanedimethanol, or 1,4-cyclohexanediol.

4. The element of claim 1 wherein said aliphatic dibasic acid is sebacic acid, glutaric acid, adipic acid, azelaic acid, or 1,4-cyclohexanedicarboxylic acid.

5. The element of claim 1 wherein said layer containing said dye image is a polycarbonate having a number average molecular weight of at least about 25,000.

6. The element of claim 5 wherein said polycarbonate is a bisphenol A polycarbonate comprising recurring units having the formula:

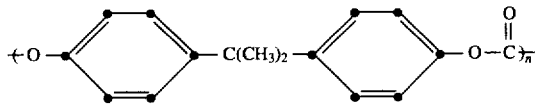

wherein n is from about 100 to about 500.

7. The element of claim 1 wherein said support is poly(ethylene terephthalate) having a white pigment incorporated therein.

8. The element of claim 1 which has a cover sheet laminated to at least one outer surface by said adhesive.

9. The element of claim 8 wherein said cover sheet is poly(ethylene terephthalate).

10. The element of claim 8 wherein said cover sheet is polycarbonate.

11. The element of claim 1 which has a poly(ethylene terphthalate cover sheet laminated to both surfaces thereof by said adhesive.

12. The element of claim 1 which has a polycarbonate cover sheet laminated to both surfaces thereof by said adhesive.

13. The element of claim 1 wherein said copolyester is formed from 1,4-butanediol; 1,6-hexanediol; and terephthalic acid.

14. The element of claim 1 wherein said copolyester is formed from 1,4-butanediol; 1,6-hexanediol; terephthalic acid; and isophthalic acid.

15. The element of claim 1 wherein said copolyester is formed from diethyleneglycol; 1,4-butanediol; terephthalic acid; and glutaric acid.

16. The element of claim 1 wherein said copolyester is formed from a blend of a random copolyester formed from diethyleneglycol; 1,4-butanediol; terephthalic acid; and glutaric acid; and a random copolyester formed from cyclohexanedimethanol; ethyleneglycol; and terephthalic acid.

17. The element of claim 1 wherein said copolyester is formed from 1,4-butanediol; sebacic acid; terephthalic acid; and isophthalic acid.

* * * * *